United States Patent [19]

Novak et al.

[11] Patent Number: 4,686,320

[45] Date of Patent: Aug. 11, 1987

[54] ELECTRONICALLY AND IONICALLY CONDUCTING ELECTRODES FOR THERMOELECTRIC GENERATORS

[75] Inventors: Robert F. Novak, Farmington Hills, Mich.; Neill Weber, Murray, Utah

[73] Assignee: Ford Motor Company, Dearborn, Mich.

[21] Appl. No.: 813,891

[22] Filed: Dec. 27, 1985

[51] Int. Cl.⁴ .............................................. H01L 35/14
[52] U.S. Cl. .................................. 136/239; 136/236.1
[58] Field of Search ............................ 136/236.1–241, 136/205–212

[56] References Cited

U.S. PATENT DOCUMENTS

| | | |
|---|---|---|
| 3,458,356 | 7/1969 | Kummer et al. . |
| 3,901,733 | 8/1975 | Toy et al. . |
| 4,049,877 | 9/1977 | Saillant et al. . |
| 4,052,738 | 10/1977 | Hosomi et al. ........................ 358/128 |
| 4,175,164 | 11/1979 | Cole . |
| 4,307,138 | 12/1981 | Powers et al. . |
| 4,393,124 | 7/1983 | Lauf et al. . |
| 4,395,432 | 7/1983 | Rizzelli et al. . |
| 4,510,210 | 4/1985 | Hunt . |

OTHER PUBLICATIONS

Final Report for DOE Contract No. De-AC02-7-9ER10347, "Research and Development Program on a Sodium Heat Engine", Oct. 1982, pp. D-1-D-10 and E-12-E-15.

*Primary Examiner*—Deborah L. Kyle
*Assistant Examiner*—T. J. Wallen
*Attorney, Agent, or Firm*—Lorraine S. Melotik; Roger L. May

[57] ABSTRACT

A composite article comprising a porous cermet electrode on a dense solid electrolyte and method of making same. The cerment electrode comprises beta-type-alumina and refractory metal.

23 Claims, No Drawings

ELECTRONICALLY AND IONICALLY CONDUCTING ELECTRODES FOR THERMOELECTRIC GENERATORS

The invention disclosed herein was made under, or in the course of, Subcontract No. 4521610 - Lawrence Berkeley Laboratory, Contract No. DE-AC03-765F00098.

TECHNICAL FIELD

This invention relates to composite articles comprising a porous ceramic/metal (cermet) electrode on solid electrolyte, which article is suitable for use in thermoelectric generators. More particularly, the invention is concerned with such composite articles, wherein the cermet electrode comprises beta-type-alumina and refractory metal.

BACKGROUND OF THE INVENTION

Thermoelectric generator devices convert heat energy from a heat source directly to electrical energy. One type of thermoelectric generator generates electrical energy by electrochemically expanding alkali metal across a solid electrolyte. Such generators, wherein sodium metal is employed as the working substances, have been described in U.S. Pat. Nos. 3,458,356 and 4,510,210 and are commonly referred to as "sodium heat engines". These thermoelectric generators are discussed herein as exemplary of one type of generator in which the article of this invention may be suitably used.

The sodium heat engine generally comprises a closed container separated into a first and second reaction zone by a solid electrolyte. Liquid sodium metal is present in the first reaction zone (i.e., on one side of the solid electrolyte). In the second reaction zone (i.e., on the other side of the solid electrolyte), a permeable, electrically conducting electrode is in contact with the solid electrolyte. During operation of such a device, a heat source raises the temperature of liquid sodium metal within the first reaction zone to a high temperature and corresponding high vapor pressure, which creates a sodium vapor pressure difference across the solid electrolyte. In response to this pressure difference, the elemental sodium gives up electrons to an electrode in contact with the sodium metal and the resulting sodium ions migrate through the solid electrolyte. The electrons, having passed through an external load, neutralize sodium cations at the permeable electrode-solid electrolyte interface. Elemental sodium metal evaporates from the permeable electrode and migrates through the low pressure second reaction zone to a low temperature condenser. The condensed liquid sodium may then be returned back to the higher temperature first reaction zone.

In the thermoelectric generator system just described, the electrode on the surface of the electrolyte from which the alkali metal ions emerge is a positive electrode and must be present in order to transfer electronic charge from the external circuit to the alkali metal ions. This completes the electrochemical circuit required for operation of the generator. The operation of such thermoelectric generator systems require electrodes possessing special properties, some of which are difficult to optimize simultaneously. For example, it is necessary for efficient generators that the positive electrode conduct electrons from the electrical load to a broad surface of the electrolyte, doing so with low electrical resistance. At the same time, it is necessary for the positive electrode to permit the passage of alkali metal atoms from the electrolyte-electrode interface through the electrode to the opposite electrode surface, from which they may pass to the condenser. While the former requirement is more likely to be attained by dense, thick electrodes to promote low resistance, the latter requirement suggests thin, permeable electrodes to promote the easy passage of the alkali metal through the electrode. Additionally, the electrodes must be relatively unreactive with the alkali metal and have low vapor pressure to prevent their loss through evaporation in the high temperature, high vacuum environment in which they operate. Sill further, the electrode material must have a thermal expansion coefficient offering a fair match to that of the electrolyte substance. This is necessary in order to prevent delamination of the electrode from the electrolyte which could result from differential expansion and contraction of the electrode and electrolyte materials during the heating and cooling cycles to which such systems are exposed during use.

U.S. Pat. No. 4,049,877, to Saillant et al, is directed to a thermoelectric generator wherein the improvement comprises employing, as the electrode, a porous metal film deposited on the solid electrolyte by chemical vapor deposition. Among the metals taught therein as suitable for use as the electrode are molybdenum, tungsten, chromium, nickel and iron. Cole, in U.S. Pat. No. 4,175,164, teaches that the surface configuration of electrodes formed by chemical vapor deposition techniques (such as those in the above Saillant et al patent) may be modified by exposing such electrodes to oxidizing conditions, following by reducing conditions. It is taught by Cole that these conditions effect an oxidation, reduction and consequent redeposition of the already deposited electrode which make it desirably more porous, thus providing improved electrode efficiency. Both of these patents are commonly assigned with this invention. However, these metal electrodes, while being capable of excellent power and efficiency in the initial stages of operation, have shown a tendency to lose power with operating time at high temperatures.

DISCLOSURE OF THE INVENTION

This invention is directed to a composite article comprising a porous cermet electrode on dense solid electrolyte, the porous cermet electrode (i) having a thickness of at least 10 microns, (ii) comprising beta-type-alumina and refractory metal, (iii) being continuously electronically conducting, (iv) having a surface resistance of less than about 30 ohms/square, and (v) being applied onto the dense solid electrolyte by spraying a powder comprising beta-type-alumina through a source of heat sufficient to melt the beta-type-alumina and deposit it as a porous coating onto the solid electrolyte.

Preferably, the refractory metal is selected from the group consisting of molybdenum, titanium, tungsten, niobium and zirconium. The refractory metal preferably comprises between about 25 and about 75 volume percent of the cermet electrode and the surface resistance (often termed "sheet resistance") of the porous cermet electrode is preferably between about 0.1 and about 30 ohms/square. Preferably, the beta-type-alumina of the cermet electrode as well as the dense solid electrolyte comprise beta"-alumina.

In the present invention, the porous cermet electrode comprising beta-type-alumina and refractory metal is applied onto the dense solid electrolyte by spraying a powder comprising beta-type-alumina through a source of heat sufficient to melt at least the beta-type-alumina and deposit it as a porous coating onto the dense solid electrolyte. Exemplary of such deposition methods, useful in this invention, are flame spraying and plasma spraying. The refractory metal may be incorporated into the cermet electrode in several different ways. According to one method for making the article of the present invention, a powdered mixture comprising beta-type-alumina and refractory metal or salt thereof is sprayed through a source of heat sufficient to melt at least beta-type-alumina and deposit the mixture as a porous coating onto the dense solid electrolyte. In another method for making the article of the present invention, powdered beta-type-alumina is first sprayed through a source of heat sufficient to melt the beta-type-alumina and deposit it as a porous coating onto the dense solid electrolyte, thereafter a salt of the refractory metal is absorbed into the porous coating on the electrolyte. If refractory metal salts are employed in either of the methods described above, the refractory metal salts in the porous coating are subsequently reduced to the (free) refractory metal. This invention is also directed to such methods for making the article described above.

The novel electrode materials of the present invention exhibit the aforementioned special properties desired for thermoelectric generator electrodes. Advantageously, the porous cermet electrodes of the invention, since they comprise ionically conductive beat-type-alumina as well as electronically conductive refractory metal, have the property that they can conduct both ions and electrons. This allows the porous cermet electrodes to advantageously provide an extended region in which the charge exchange between the ions and electrons can take place. This extended interfacial charge-exchange region is in contrast to the limited metal electrode/solid electrolyte interface of prior art thermoelectric generator electrodes. Such an extended interfacial charge-exchange region reduces interfacial impedance and provides greater power output per unit apparent area of electrode, resulting in higher electrode efficiency. Still another advantage of the present invention is that the beta-type-alumina or mixture of beta-type-alumina and refractory metal or salt thereof is deposited onto the solid electrolyte by such methods as flame spraying or plasma spraying. Such application techniques provide an especially economical, rapid means by which to apply such an electrode layer to the solid electrolyte. Additionally, such electrode application techniques allow for fabrication of electrode/electrolyte articles of thin cross section and/or unusual shapes.

DETAILED DESCRIPTION OF THE INVENTION

The present invention article comprises a thick film (i.e., greater than about 10 microns) of porous cermet electrode comprising beta-type-alumina and refractory metal, which electrode is continuously electronically conducting, on the surface of dense solid electrolyte. This article is suitable for use in thermoelectric generators. The porous cermet electrode has a surface resistance of less than about 30 ohms/square and is applied onto the dense solid electrolyte by spraying a powder comprising beta-type-alumina through a source of heat sufficient to melt at least the beta-type-alumina and deposit it as a porous coating onto the dense solid electrolyte.

The ceramic material comprising the cermet electrode of this invention comprises beta-type-alumina. The members of the family of beta-type-alumina all exhibit a generic crystalline structure which is readily identifiable by X-ray diffraction. Beta-type-alumina is a material which may be thought of as a series of layers of aluminum oxide held apart by layers of Al—O bond chains with, in the case of sodium beta-type-alumina, sodium ions occupying sites between the aforementioned layers and columns. Among the numerous beta-type-alumina materials useful in the ceramic material in the cermet electrode are the following:

1. Standard beta-type-alumina is formed from compositions comprising at least about 80 percent by weight, preferably at least about 85 percent by weight, aluminum oxide and between about 5 and about 15 weight percent, preferably between about 8 and about 11 weight percent, sodium oxide. Beta-alumina is one crystalline form which may be represented by the formula $Na_2O.11Al_2O_3$. The second crystalline form is beta''-alumina which may be represented by the formula $Na_2O.5Al_2O_3$. It will be noted that the beta''-alumina crystalline form of beta-type-alumina contains approximately twice as much soda (sodium oxide) per unit weight of material as does the beta-alumina. It is the beta''-aluminum crystalline structure which is the preferred beta-type-alumina for use in the cermet electrode of this invention. Each of these beta-type-alumina crystalline forms can be easily identified by its own characteristic X-ray diffraction pattern.

2. Boron oxide, $B_2O_3$, modified beta-type-alumina wherein about 0.1 to about 1 weight percent of boron oxide is added to the composition.

3. Substituted beta-type-alumina wherein the sodium ions of the composition are replaced in part or in whole with other positive ions which are preferably metal ions, e.g., lithium ions, silver ions, lead ions, etc.

4. Beta-type-alumina modified by the addition of a minor portion by weight of metal ions having a valance not greater than 2, such that the modified beta-type-alumina composition comprises a major proportion by weight of ions of aluminum and oxygen and a minor proportion by weight of metal ions in crystal lattice combination with sodium cations which migrate in relation to the crystal lattice as a result of electric field. The preferred embodiment for use in thermoelectric generators is that wherein the metal ion having a valance not greater than 2 is either lithium or magnesium or a combination of lithium and magnesium. These metals may be included in the composition in the form of lithium oxide or magnesium oxide or mixtures thereof in amounts ranging from about 0.1 to about 5 weight percent. These metal ions, particularly lithium, are generally added to beta''-alumina to stabilize the beta''-alumina in that form. Otherwise, at high temperatures, the beta''-alumina has a tendency to convert to the beta-alumina form.

The cermet electrode of this invention also comprises refractory metal. Exemplary of refractory metals which may be suitably used in the cermet electrode of this invention are those selected from the group consisting of molybdenum, titanium, tungsten, niobium and zirconium. The electrode may comprise one refractory metal or a mixture of refractory metals. Generally the refractory metal comprises between about 25 and about 75 volume percent of the cermet electrode. The selection of the optimal amount of refractory metal to be present in the cermet electrode would be apparent to those in the art in view of the present disclosure and is dependent, e.g., on the desired electrical conductivity and the thickness of the electrode, the particular refractory metal employed, the porosity of the electrode and the intended use of the article.

The cermet electrode is applied onto the dense solid electrolyte by spraying a powder of at least the beta-type-alumina through a source of heat sufficient to melt the beta-type-alumina and deposit it as a porous coating onto the dense solid electrolyte. The refractory metal may be incorporated into the cermet electrode in various ways. One method for doing this comprises mixing the refractory metal with the beta-type-alumina to form a powdered mixture which is sprayed through a source of heat sufficient to melt at least the beta-type-alumina and deposit the mixture as a porous coating, e.g., by plasma or flame spraying, onto the dense solid electrolyte. Since the porous cermet electrode applied to the solid electrolyte in this way is a fine grained mixture, the metal particles are in sufficiently close proximity so that bulk electronic conduction is possible through the electrode. Metal salts of the refractory metal, such as $(NH_4)_2Mo_2O_7$, $MoOCl_4$, $MoO_2Cl_2$, and corresponding salts of other refractory metals, may be substituted, in part or in total, for the refractory metal in the mixture. However, if refractory metal salts are employed in the powder mixture to be deposited onto the dense solid electrolyte, it will be necessary to subsequently expose the porous coating deposited onto the solid electrolyte to a reducing environment, e.g., hydrogen, at high temperatures so as to convert the refractory metal salt to the free refractory metal. As is known to those skilled in the art, some refractory metal salts reduce more readily than others. For example, the salts of molybdenum and tungsten reduce more easily than salts of titanium, niobium or zirconium. A single salt or a mixture of salts may be employed in the powder mixture applied to the dense solid electrolyte. The preferred method for applying the cermet electrode to the dense solid electrolyte comprises flame or plasma spraying a powder mixture of beta-alumina and refractory metal. Such method is preferred since it does not require any subsequent reducing treatment.

Another method for applying the cermet electrode onto the dense solid electrolyte comprises spraying powdered beta-type-alumina through a source of heat sufficient to melt it and deposit it as a porous coating onto the dense solid electrolyte, e.g., by plasma or flame spraying, and thereafter absorbing, in the porous beta-type-alumina deposited on the dense solid electrolyte, a salt of a refractory metal. The salt may be absorbed into the porous beta-type-alumina by a two step sequence. The first step of the sequence comprises contacting the beta-type-alumina deposited on the solid electrolyte with a solution, preferably aqueous and saturated, of a soluble salt of a refractory metal, so as to impregnate the porous beta-type-alumina deposited on the solid electrolyte with the solution of the salt of the refractory metal. Exemplary of such salts which may be used in an aqueous solution are ammonium dimolybdate, molybdenum tetrachloride oxide, molybdenum dichloride oxide, and similar salts of other refractory metals, e.g., tungsten. Mixtures of such soluble salts may also be employed. Another solution that can be used comprises that formed by dissolving $MoO_3$ in hot hydrochloric acid. In this method, the solution should be such that it contains essentially no chemical element that will not be driven off as a vapor during the reduction of the salts, e.g., by a hydrogen reduction at about 800°–1000° C. In the second step, the solution impregnated beta-type-alumina coating is subjected to conditions which cause the dissolved salt to precipitate out of the impregnated solution into the pores of the porous beta-type-alumina on the solid electrolyte. This precipitation can be caused by exposing the impregnated coating to a solvent immiscible with the impregnating solution and in which the salts are sparingly soluble. If the solution is an aqueous solution, solvents such as alcohol, acetone, other ketones and aldehydes may be used. The article is subsequently dried, e.g., in a vacuum oven, so as to evaporate the liquid from the porous beta-type-alumina on the dense solid electrolyte. Contacting of the beta-type-alumina with the aforementioned solution and subsequently with the solvent may take place by any suitable method, e.g., by immersion of the article in the liquids, spraying or painting of the article with the liquids, etc. The procedure for absorbing the salt of a refractory metal into the porous beta-type-alumina on the solid electrolyte can be repeated until the desired amount of the refractory metal salt has been absorbed into porous beta-type-alumina on the solid electrolyte. Selection of the optimal amount of refractory metal salt to be absorbed into the beta-type-alumina on the solid electrolyte would be apparent to those of the art in view of the present disclosure. After absorbing the desired amount of salt into the porous beta-type-alumina on the solid electrolyte according to this second method, it is necessary to reduce the salt of the refractory metal in the beta-type-alumina to the free refractory metal, e.g., by exposing the beta-type-alumina to hydrogen at high temperatures. Selection of appropriate and optimal salt solutions and solvents according to this second method would be apparent to those in the art in view of the present disclosure. By means of this second method, the refractory metal particles are absorbed on internal pore surfaces of the coating which are adequately interconnected to produce the necessary electronic conductivity. For example, according to this second method, the beta-type-alumina may be applied by plasma or flame spraying onto the solid electrolyte. Thereafter, the beta-type-alumina porous coating on the solid electrolyte is contacted with a solution, preferably an aqueous saturated solution, of a salt of a refractory metal, e.g., ammonium dimolybdate, so that the solution is adsorbed into the pores of the beta-type-alumina on the solid electrolyte. Subsequently, the beta-type-alumina coating is exposed to a solvent, e.g., alcohol, which causes precipitation of the salt, in this instance ammonium dimolybdate, from the solution absorbed in the coating, and into the pores of the ceramic coating. Finally, the salt is reduced in hydrogen at 800° C. to molybdenum.

Preferably, for optimum operation of the article of this invention in a thermoelectric generator system, the electronic surface resistance of the electrode should be less than about 30 ohms/square, preferably in the range of about 0.1 to about 30 ohms/square. As is known to those skilled in the art, this surface resistance can be produced by the proper choice of the amount of refractory metal in the cermet electrode and the thickness of the electrode. The particular refractory metal used will also effect the resulting resistance sine some refractory metals are inherently more conductive than others, as is known in the art. Selection of the optimal amount of refractory metal to be present in the cermet electrode would be within the skill of those in the art in view of the present disclosure.

As hereinbefore discussed, the cermet electrode is applied to the solid electrolyte by a method which comprise spraying at least the beat-type-alumina through a source of heat sufficient to melt the beta-type-alumina and deposit it on the solid electrolyte. Such techniques for spraying a powdered material through a source of heat sufficient to melt it and subsequently depositing it on a substrate are well known in the art and include plasma and flame spraying. As is known in the art, the process parameters for plasma and flame spraying include: (1) flame composition (which is on the fuel rich side of stoichiometric so as not to oxidize the material being sprayed), (2) powder flow rate, (3) powder flow velocity, (4) distance of the spray gun to the substrate and (5) rotation speed of the substrate, which process parameters may be varied. Selection of the optimal parameters to be employed in plasma or flame spraying the electrode material (i.e., the beta-type-alumina and optionally the refractory metal or salts thereof) will be apparent to those in the art in view of the present disclosure. In plasma or flame spraying, the parameters are adjusted so as to produce a liquid phase in the powder before it impacts on the surface of the substrate, herein, the solid electrolyte. The presence of the liquid phase is desirable for the promotion of adhesion of the electrode material to the solid electrolyte. The presence of the liquid phase may be determined by Scanning Electron Microscopy (SEM) evaluation of the microstructure. As is known in the art, the morphology of the deposited film can be varied considerably by adjusting the parameters listed above. It is possible to vary the conditions of deposition over a considerable range while producing electrodes suitable for use in thermoelectric generators. In practice, the cermet electrode must be porous enough to permit the alkali metal vapor to pass therethrough and sufficiently thick and continuous to conduct electricity. The flame or plasma spray process is adjusted so that the applied electrode preferably has a range of porosity from about 10 to about 30 volume percent. Porosity may be measured by such techniques as surface area adsorption, e.g., by Brunauer Emmett and Teller (BET) and by Scanning Electrom Microscopy (SEM). This range of porosity provides optimal electrode charge exchange conditions which allow for maximum efficiency of the electrode during use in the thermoelectric generator.

It is preferable that the powdered material which is plasma or flame sprayed according to this invention has a particle size of 1 to 10 microns or less, in order to produce a fine grained microstructure in the finished electrode. However, commercially available plasma and flame spraying equipment generally employs the powder to be sprayed in a fairly coarse 50 to 100 microns diameter, in order for the powder to flow smoothly through the powder feeder, hose and gun. This large particle size gives coatings with a coarse microstructure not generally suitable for a thermoelectric generator electrode. One way to produce fine grained electrodes by means of conventional equipment is to cause the fine grained powder to agglomerate into 70 to 100 micron particles before spraying. This may be done, e.g., by mixing a binder dissolved in a solvent (e.g., acrylic binder in acetone) with the fine grained powder to be sprayed. This slurry may then be mixed continuously while the solvent is allowed to evaporate. In this way, the viscosity of the mixture slowly increases and prevents the dense refractory metal or refractory metal salt, when present in the slurry, from settling. It may then be dried, e.g., in a vacuum oven, and subsequently milled until it is of suitable particle size to be employed in the spray system, generally at least −200 mesh (about 77 microns). The powder, after it is applied to the solid electrolyte, will have the particle size of the "unaglomerated" fine grained powder, thus forming the desired fine grained microstructure in the cermet electrode. It has been found that by employing beta-type-alumina in the flame or plasma spraying process which has not been fully calcined and which is a mixture of beta and beta"-alumina phases, the electrode can have the preferred fine grained microstructure. While a particle size of 1 to 10 microns or less is preferred for the powder being deposited on the solid electrolyte according to this invention, such particle size is not meant to be limiting. Other particle size may be suitably employed, as would be apparent to those in the art in view of the present invention.

The solid electrolyte of the article of this invention may be selected from a wide range of glass or polycrystalline ceramic materials. Among the glasses which may be used with thermoelectric generators employing alkali metals as working substances and which demonstrate unusually high resistance to attack by alkali metal are those having one of the two following compositions: (1) between about 47 and about 58 mole percent sodium oxide, about 0 to about 15, preferably about 3 to about 12, mole percent aluminum oxide, and about 34 to about 15 mole percent silicon dioxide; and (2) about 35 to about 65, preferably about 47 to about 58, mole percent sodium oxide, about 0 to about 30, preferably about 20 to about 30, mole percent aluminum oxide, and about 20 to about 50, preferably about 20 to about 30, mole percent boron oxide. These glasses may be prepared by conventional glass making procedures using the listed ingredients and firing at temperatures of about 2700° F.

Polycrystalline ceramic materials desirable as the solid electrolyte are bi- or multi- metal oxides. Among the polycrystalline bi- or multi- metal oxides most useful in thermoelectric generators are those of the aforementioned family of beta-type-alumina, all of which exhibit a generic crystalline structure which is readily identifiable by X-ray defraction. Among the numerous polycrystalline beta-type-alumina materials suitable as the solid electrolytes are beta and beta"-alumina, with bet-a"-alumina being preferred.

The solid electrolyte is shaped so as to conform with the design considerations of the thermoelectric generator. For example, in U.S. Pat. No. 4,049,877, the solid electrolyte is a tube closed at one end. Generally, such tubes have a wall thickness of about 0.1 centimeter or less. The solid electrolyte of the article of this invention is not limited to any particular shape. The method of this invention for applying the cermet electrode to the solid electrolyte advantageously allows for the applying of cermet electrodes to solid electrolytes of unusual shapes. With the advent of beta-alumina and other ceramics of high structural integrity, wall thickness of the solid electrolyte as low as 100 microns are possible. It has been discovered that reducing the thickness of the solid electrolyte improves overall efficiency by reduction of bulk resistance. As hereinbefore mentioned, the thickness of the cermet electrode is based on the desired conductivity of the electrode and the amount and type of refractory metal in the electrode. Generally, the thickness of the cermet electrode layer is between about 20 and about 100 micrometers deposited on a solid electrolyte of relatively much greater thickness, e.g., 1000 microns. However, such discription of relative thickness of cermet electrode and solid electrolyte is not meant to limit the article of this invention. Selection of the optimal thickness of the solid electrolyte-cermet electrode would be within the skill of one in the art in view of the present disclosure.

The following examples illustrate the preferred aspects of this invention and are not meant to limit the scope of this invention. Those in the art will appreciate that many modifications can be made that will achieve the cermet electrodes/solid electrolyte article of this invention.

EXAMPLE 1

An electrode composed of 75% beta/beta"-alumina and 25% molybdenum metal powder (volume %) was prepared by weighing out 24.37 gms of partially calcined beta/beta"-alumina powder and 25.50 gms of molybdenum metal powder.

Six grams of acrylic binder were dissolved in 200 ml of acetone. The above alumina powder and molybdenum metal powder were then slowly added to the binder acetone solution while mixing it continuously. The resulting slurry was then mixed continuously while the acetone was allowed to evaporate. The mixture was dried overnight in an oven at 90° C. and milled until it passed 100% −200 mesh.

The powder was then placed into the powder feeder of a Metco Flame Spray System (gun type 6P - powder feeder type 3MP) and applied to a beta"-alumina tube by flame spraying as described below.

Fuel Composition: The acetylene fuel flow rate is set at 40 and the oxygen flow rate was set at 40. This gives a flame composition that is on the slightly rich side of stoichiometry. The flame at these settings was also at the right temperature for producing a liquid phase in the cermet powder before it impacts the surface. Analytic determination and adjustment of the flame composition may be carried out using a heated $ZrO_2$ oxygen sensor.

Powder Transport Gas: The powder to be flame sprayed was placed in the powder feeder unit of the system and was transported to the gun from the powder feeder unit by a nitrogen carrier gas. This gas was delivered at a pressure of 2-5 psi and a flow rate setting of 40 (on the Metco 3MP unit). This flow, if lower, will fail to carry the cermet powder through the supply hose and the oxy-acetylene flame fast enough to prevent the loss of sodium oxide from the beta"-alumina. If the flow is higher, the resulting electrode will be less porous than desirable for sodium heat engine applications.

Powder Feed Rate: The powder and the carrier gas were mixed within the Metco 3MP feeder unit. In the preferred operating regime, as in these Examples, the powder flow rate was set at 60. This powder flow rate was preferred since higher rates lead to lower powder temperatures as the particles impact on the solid electrolyte tube, and produce an electrode with poor adhesion to the substrate. Lower powder flow rates also lead to excessive powder temperatures, which may cause the beta"-alumina to lose $Na_2O$ during the procedure.

Substrate Handling: The substrate, a dense solid electrolyte beta"-alumina tube, was placed in the chuck and rotated at a rate of about 500 rpm (rates of between about 500 to about 1500 rpm are generally used). The flame sprayed powder flow was directed onto the receding edge of the electrolyte tube to minimize the impact velocity of the particles.

The tube was allowed to cool before removing it from the chuck. The resulting coating was approximately 200 micrometers thick and approximately 15% porous. The electrode of the example had a surface resistance of 0.58 ohm/square and a power output of 0.208 watt/cm$^2$ at 800° C.

Utilization of the optimal combination of parameters and techniques described above led to the high quality electrodes described in the examples. However, as would be apparent to those in the art, in view of the present disclosure, these parameters may have to be adjusted to produce such high quality electrodes on other types of equipment.

EXAMPLE 2

An electrode of 25% beta"-alumina and 75% molybdenum metal powder (volume %) was prepared by weighing out 8.12 grams of fully calcined beta"-alumina powder and 76.5 grams of −325 mesh molybdenum powder.

Six grams of acrylic binder was dissolved in 200 ml of acetone. The beta"-alumina powder and molybdenum metal powder were then slowly added to the binder-acetone solution while mixing it continuously. The resulting slurry was then mixed continuously while the acetone was allowed to evaporate. The mixture was dried overnight in an oven at 90° C. and then milled until it passes 100% −200 mesh.

The powder was then applied to a beta"-alumina tube by the method of Example 1. The tube was allowed to cool before it was removed from the chuck.

The resulting coating was approximately 200 micrometers thick and approximately 25% porous. The electrode's resistance was 0.10 ohm/square and its power output was 0.15 watt/cm$^2$ at 800° C.

EXAMPLE 3

An electrode of 75% beta"/beta-alumina and 25% molybdenum (volume %) where the molybdenum was incorporated as $(NH_4)_2Mo_2O_7$ was prepared by weighing out 54.84 grams of $(NH_4)_2Mo_2O_7$ and 24.37 grams of a partially calcined beta/beta"-alumina powder.

Six grams of acrylic binder were dissolved in 200 ml of acetone. The beta-alumina and molybdenum metal salt powder were then slowly added to the binder-acetone solution while mixing it continuously. The resulting slurry was then mixed continuously while the acetone was allowed to evaporate. The mixture was dried overnight in an oven at 90° C. and then milled until it passed 100% −200 mesh.

The powder was then placed into the powder feeder for the flame spray unit and flame sprayed onto a beta"-alumina tube as described in Example I. The tube was allowed to cool before it was removed from the chuck.

The resulting electrode coating was treated in a hydrogen furnace at 800° C. to reduce any residual metal oxides to the native metal. The electrodes has a resistivity of 0.59 ohm/square and a power output of 0.152 watt/cm$^2$ at 800° C.

EXAMPLE 4

Four grams of acrylic binder is dissolved in 150 ml of acetone. 25 grams of partially calcined beta/beta"-alumina powder is added slowly to the binder acetone solution while mixing it continuously. The resulting slurry is then mixed continuously while the acetone is allowed to evaporate. The mixture is dried overnight in an oven at 90° C. and then milled until it passes 100% −200 mesh.

The powder is then placed into the powder feeder from the flame spray unit and flame sprayed onto a beta"-alumina tube as described in Example I. The tube is allowed to cool before it is removed from the chuck. The tube was then immersed in a saturated solution of ammonium dimolybdate. The vessel containing the solution is evacuated and then vented to atmosphere to impregnate the pores with the solution. The tube is next immersed in isopropanol to precipitate the molybdenum salt by solvent exchange, and dried in a vacuum oven at 120° C. The metal deposit, obtained by repeating the procedure three times followed by reduction in hydrogen at 800° C., has acceptable low surface (sheet) resistance.

EXAMPLE 5

An electrode of 50% beta"-alumina and 50% titanium (volume %) was prepared by weighing out 81.25 grams of fully calcined beta"-alumina powder and 112.75 grams of −325 mesh titanium powder.

Six grams of acrylic binder was dissolved in 200 ml of acetone. The beta"-alumina powder and titanium metal powder are then slowly added to the binder-acetone solution while mixing it continuously. The resulting slurry is then mixed continuously while the acetone was allowed to evaporate. The mixture is dried overnight in an oven at 90° C. and then milled until it passes 100% −200 mesh.

The powder was then applied to a beta"-alumina tube by the method of Example 1. The tube is allowed to cool before it was removed from the chuck. The resulting coating was 150 microns thick and approximately 20% porous. The surface resistance of the electrode was 3 ohms/square and the power output was 0.14 watt/cm.

What we claim is:

1. A composite article comprising a cermet electrode on solid electrolyte, said porous cermet electrode (i) having a thickness of at least 10 microns, (ii) comprising beta-type-alumina and refractory metal, (iii) being continuously electronically conducting, (iv) having a surface resistance of less than about 30 ohms/square, and (v) being applied to said solid electrolyte by spraying a powder comprising said beta-type-alumina through a source of heat sufficient to melt at least the beta-type-alumina and deposit it as a coating onto said electrolyte.

2. An article according to claim 1, wherein said beta-type-alumina is selected from beta-alumina and beta"-alumina.

3. An article according to claim 1, wherein said refractory metal is selected from the group consisting of molybdenum, titanium, tungsten, niobium and zirconium.

4. An article according to claim 1, wherein said refractory metal comprise between about 25 and about 75 volume percent of said cermet electrode.

5. An article according to claim 1, wherein said surface resistance of said electrode is between about 0.1 and about 30 ohms/square.

6. An article according to claim 1, wherein said cermet electrode is applied to said solid electrolyte by spraying a powdered mixture comprising said beta-type-alumina and said refractory metal through a source of heat sufficient to melt at least said beta-type-alumina and deposit the mixture as a coating onto said solid electrolyte.

7. An article according to claim 6, wherein said refractory metal is selected from the group consisting of molybdenum, titanium, tungsten, niobium and zirconium.

8. An article according to claim 1, wherein said cermet electrode is applied to said solid electrolyte by (i) spraying a powdered mixture comprising said beta-type-alumina and salts of said refractory metal through said source of heat and (ii) thereafter reducing said salt of said refractory metal in the coating to said refractory metal.

9. An article according to claim 8, wherein said refractory metal is selected from the group consisting of molybdenum, titanium, tungsten, niobium and zirconium.

10. An article according to claim 1, wherein said cermet electrode is applied to said solid electrolyte by (i) spraying powdered beta-type-alumina through said source of heat, (ii) contacting said coating on said solid electrolyte with a solution of a salt of said refractory metal so as to impregnate pores of said coating with said solution of said salt, (iii) causing said salt of said refractory metal to be precipitated out of the impregnated solution into pores of said coating on said dense solid electrolyte, (iv) evaporating liquid from said coating on said solid electrolyte, and (v) reducing said salt of said refractory metal precipitated into said pores of said coating to said refractory metal.

11. An article according to claim 10, wherein said refractory metal is selected from the group consisting of molybdenum, titanium, tungsten, niobium and zirconium.

12. A method for making an article comprising a continuously electronically conductive cermet electrode on solid electrolyte, which method comprises:
spraying a powdered mixture comprising beta-type-alumina and refractory metal through a source of heat sufficient to melt at least said beta-type-alumina and depositing said mixture as a coating on said solid electrolyte, said cermet electrode having (i) a thickness of at least 10 microns and (ii) a surface resistance of less than about 30 ohms/square.

13. A method according to claim 12, wherein said refractory metal is selected from the group consisting of molybdenum, titanium, tungsten, niobium and zirconium.

14. A method according to claim 12, wherein said refractory metal comprises between about 25 and about 75 volume percent of said powdered mixture.

15. A method according to claim 12, wherein said surface resistance of said cermet electrode is between about 0.1 and about 30 ohms/square.

16. A method for making an article comprising a continuously electronically conductive cermet electrode on solid electrolyte, which method comprises:
spraying a powdered mixture comprising beta-type-alumina and salt of refractory metal through a source of heat sufficient to melt at least said beta-type-alumina and deposit said mixture as a porous coating onto said electrolyte to a thickness of at least 10 microns, and
reducing said salt of said refractory metal in said coating to the refractory metal, said cermet electrode having a surface resistivity of less than about 30 ohms/square.

17. A method according to claim 16, wherein said refractory metal is selected from the group consisting of molybdenum, titanium, tungsten, niobium and zirconium.

18. A method according to claim 16, wherein said refractory metal comprises between about 25 and about 75 volume percent of said powdered mixture.

19. A method according to claim 16, wherein said surface resistance of said cermet electrode is about 0.1 and about 30 ohm/square.

20. A method for making an article comprising a continuously conductive cermet electrode on dense solid electrolyte, which method comprises:

spraying powdered beta-type-alumina through a source of heat sufficient to melt it and deposit it as a coating on said solid electrolyte to a thickness of at least 10 microns, contacting said coating on said solid electrolyte with a solution of a salt of said refractory metal so as to impregnate pores of said coating with said solution, causing said salt to be precipitated out of the impregnated solution into the pores of said coating on said solid electrolyte, evaporating liquid from said coating on said solid electrolyte, and reducing said salt of said refractory metal precipitated into said pores of said coating to said refractory metal, said cermet electrode having a surface resistance of less than about 30 ohms/square.

21. A method according to claim 20, wherein said refractory metal is selected from the group consisting of molybdenum, titanium, tungsten, niobium and zirconium.

22. A method according to claim 20, wherein said refractory metal comprises between about 25 and about 75 volume percent of said powdered mixture.

23. A method according to claim 20, wherein said surface resistance of said cermet electrode is between about 0.1 and about 30 ohm/square.

* * * * *